United States Patent
Ryne et al.

(10) Patent No.: US 11,383,756 B2
(45) Date of Patent: Jul. 12, 2022

(54) SYSTEM, METHOD AND APPARATUS TRANSLATING AND TELESCOPING A STEERING COLUMN

(71) Applicant: Steering Solutions IP Holding Corporation, Saginaw, MI (US)

(72) Inventors: Patrik Ryne, Lake Orion, MI (US); George E. Arlt, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/036,111

(22) Filed: Sep. 29, 2020

(65) Prior Publication Data
US 2021/0129896 A1    May 6, 2021

Related U.S. Application Data

(60) Provisional application No. 62/931,280, filed on Nov. 6, 2019.

(51) Int. Cl.
*B62D 1/187*     (2006.01)
*B62D 1/181*     (2006.01)
*B62D 1/185*     (2006.01)

(52) U.S. Cl.
CPC .............. *B62D 1/187* (2013.01); *B62D 1/181* (2013.01); *B62D 1/185* (2013.01)

(58) Field of Classification Search
CPC ........ B62D 1/187; B62D 1/181; B62D 1/185; B62D 1/183; B62D 1/189
See application file for complete search history.

(56) References Cited

U.S. PATENT DOCUMENTS

| 10,633,013 | B2 | 4/2020 | Kreutz et al. | |
| 2008/0150270 | A1* | 6/2008 | Longo | B62D 1/187 |
| | | | | 280/775 |
| 2015/0239488 | A1* | 8/2015 | Caverly | B62D 1/16 |
| | | | | 701/49 |
| 2015/0375768 | A1 | 12/2015 | Fevre et al. | |
| 2017/0151975 | A1* | 6/2017 | Schmidt | B62D 1/183 |
| 2019/0111960 | A1 | 4/2019 | Freudenstein et al. | |
| 2019/0210632 | A1 | 6/2019 | Derocher et al. | |
| 2019/0300042 | A1* | 10/2019 | Derocher | B62D 1/195 |
| 2020/0339176 | A1* | 10/2020 | Cao | B62D 1/187 |
| 2021/0061340 | A1* | 3/2021 | Wilkes | B62D 1/181 |
| 2021/0197882 | A1* | 7/2021 | Bayer | B62D 1/181 |
| 2021/0229733 | A1* | 7/2021 | Kurokawa | B62D 1/187 |
| 2021/0316782 | A1* | 10/2021 | Lee | B62D 5/0484 |

FOREIGN PATENT DOCUMENTS

DE    102015224602 A1    6/2017

OTHER PUBLICATIONS

English translation of Office Action regarding corresponding DE App. No. 10 20201 29 093.4; dated Apr. 12, 2021.

* cited by examiner

*Primary Examiner* — Drew J Brown
(74) *Attorney, Agent, or Firm* — Dickinson Wright PLLC

(57) ABSTRACT

A moveable steering column assembly can include a steering column having a first jacket and a first shaft. The first jacket can linearly translate relative to the steering column. The first shaft can telescope relative to the first jacket.

9 Claims, 5 Drawing Sheets

SYSTEM, METHOD AND APPARATUS TRANSLATING AND TELESCOPING A STEERING COLUMN

CROSS-REFERENCE TO RELATED APPLICATION

This application claims the benefit of priority to U.S. Provisional Patent Application Ser. No. 62/931,280, filed Nov. 6, 2019, the disclosure of which is incorporated by reference herein in its entirety.

BACKGROUND

Conventional steering columns can be electronically adjusted via actuators. Depending on the user requirements, such columns can be adjusted in various directions, including the telescope (i.e., along the axis of the column), rake (i.e., vertically) and/or tilt (i.e., pivot angle) directions. Steering columns can telescope in several ways. For example, some steering columns telescope via telescoping jackets or shafts. Other examples of steering columns can telescope via a fixed shaft and a translating jacket assembly. Therefore, known steering columns typically either have one portion of the steering column assembly (e.g., upper jacket) telescope into another portion of the steering column assembly (e.g., lower jacket) or has the jacket assembly translate in an axial direction.

Although these solutions are workable they do have limitations. Configuring the telescoping steering columns in these configurations increases the amount of space required by the steering column assembly to operate in the underlying structure. As some end use applications are actually decreasing the space available for steering column assembles, the existing telescoping solutions are becoming an issue. In particular, some end use configurations now require the ability to "stow" the steering column assembly out of the way, such as when the steering wheel is not needed. Examples include autonomous applications and, when the driver is seated in front of the steering wheel, providing more room for the driver to operate a laptop computer or other device. Thus, improvements in the compact adjustment of steering columns continue to be of interest.

SUMMARY OF THE INVENTION

According to one aspect of the disclosure, a moveable steering column assembly includes a first jacket axially translatable along a longitudinal axis of the moveable steering column assembly. The assembly also includes a second jacket operatively coupled to the first jacket and in telescoping engagement with the first jacket.

According to another aspect of the disclosure, a moveable steering column assembly includes a first jacket axially translatable along a longitudinal axis of the moveable steering column assembly. The assembly also includes a second jacket operatively coupled to the first jacket and in telescoping engagement with the first jacket. The assembly further includes a single actuator operatively coupled to the second jacket, the single actuator actuating telescoping movement of the second jacket to an end stop position within the first jacket, the single actuator also actuating axial translation of the first jacket.

According to yet another aspect of the disclosure, a moveable steering column assembly includes a first jacket axially translatable along a longitudinal axis of the moveable steering column assembly. The assembly also includes a second jacket operatively coupled to the first jacket and in telescoping engagement with the first jacket. The assembly further includes a first actuator operatively coupled to the first jacket to actuate axial translation of the first jacket. The assembly yet further includes a second actuator operatively coupled to the second jacket to actuate telescoping movement of the second jacket, wherein the second actuator is operatively mounted to the first jacket, the second actuator translating with the first jacket during translation of the first jacket. The assembly also includes a third actuator to actuate a rake adjustment of the moveable steering column assembly.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
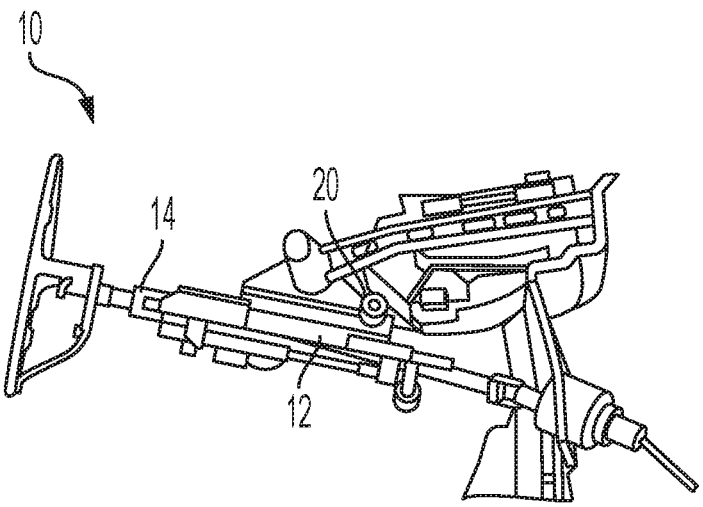
FIG. 1 is a perspective view of a moveable steering column assembly, shown in a first position.

Referring now to the drawings, where the various embodiments are shown and described herein, without limiting same, FIGS. 1-6 illustrate a series of images depicting embodiments of a system, method and apparatus for a moveable steering column assembly that can both translate and telescope.

Figure 2:
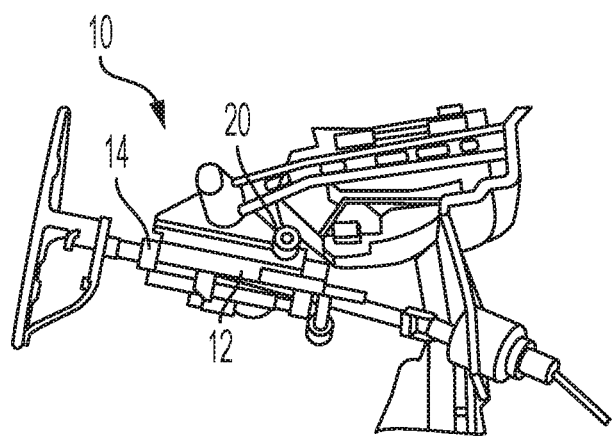
FIG. 2 is a perspective view of the moveable steering column assembly, shown in a second position.

Referring to FIGS. 1 and 2, a moveable steering column assembly is illustrated and referenced generally with numeral 10. The steering column assembly 10 includes a jacket assembly that includes multiple jacket portions. In some embodiments, and as described herein, the jacket assembly may include two jacket portions, such as a first jacket portion 12 and a second jacket portion 14. The first jacket portion 12 may be referred to as a lower jacket and the second jacket portion 14 may be referred to as an upper jacket. However, it is to be appreciated that the overall jacket assembly may include more than two jacket portions in some embodiments.

In the illustrated embodiment, the second jacket portion 14 telescopes within the first jacket portion 12. Regardless of the precise type of jacket assembly, at least one jacket portion (e.g., second jacket portion 14) telescopes within another jacket portion (e.g., first jacket portion 12) toward and away from a driver, while another jacket portion (e.g., first jacket portion 12) translates toward and away from the driver. In some embodiments, the translation and telescoping range of travel is significant enough for the steering column to be considered "stowed", which provides the driver ample space to carry out non-driving functions, either while parked or while the vehicle is operating in a semi-autonomous or autonomous mode. The moveable steering column assembly 10 described herein facilitates significant telescoping and translating range of travel.

As used herein, the term "telescope" or the like refers to one jacket portion sliding within another jacket portion in a manner that results in relative axial motion between the two jacket portions.

As used herein, the term "translate" or the like refers to a jacket portion moving in an axial direction that corresponds to the longitudinal axis of the steering column assembly, without necessarily sliding relative to another jacket portion.

Figure 3:
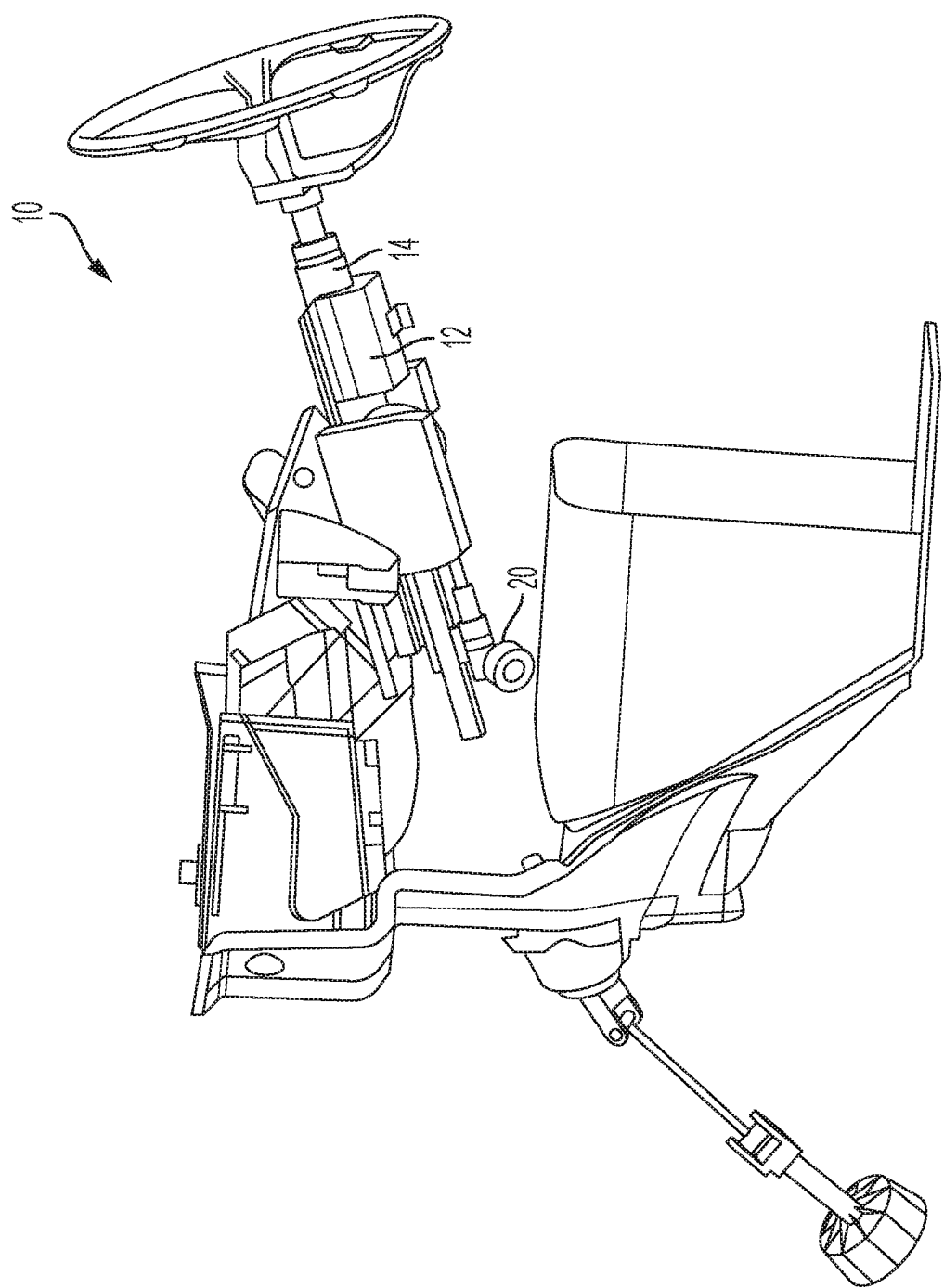
FIG. 3 is a perspective view of the moveable steering column assembly, shown in a third position.
Figure 4:
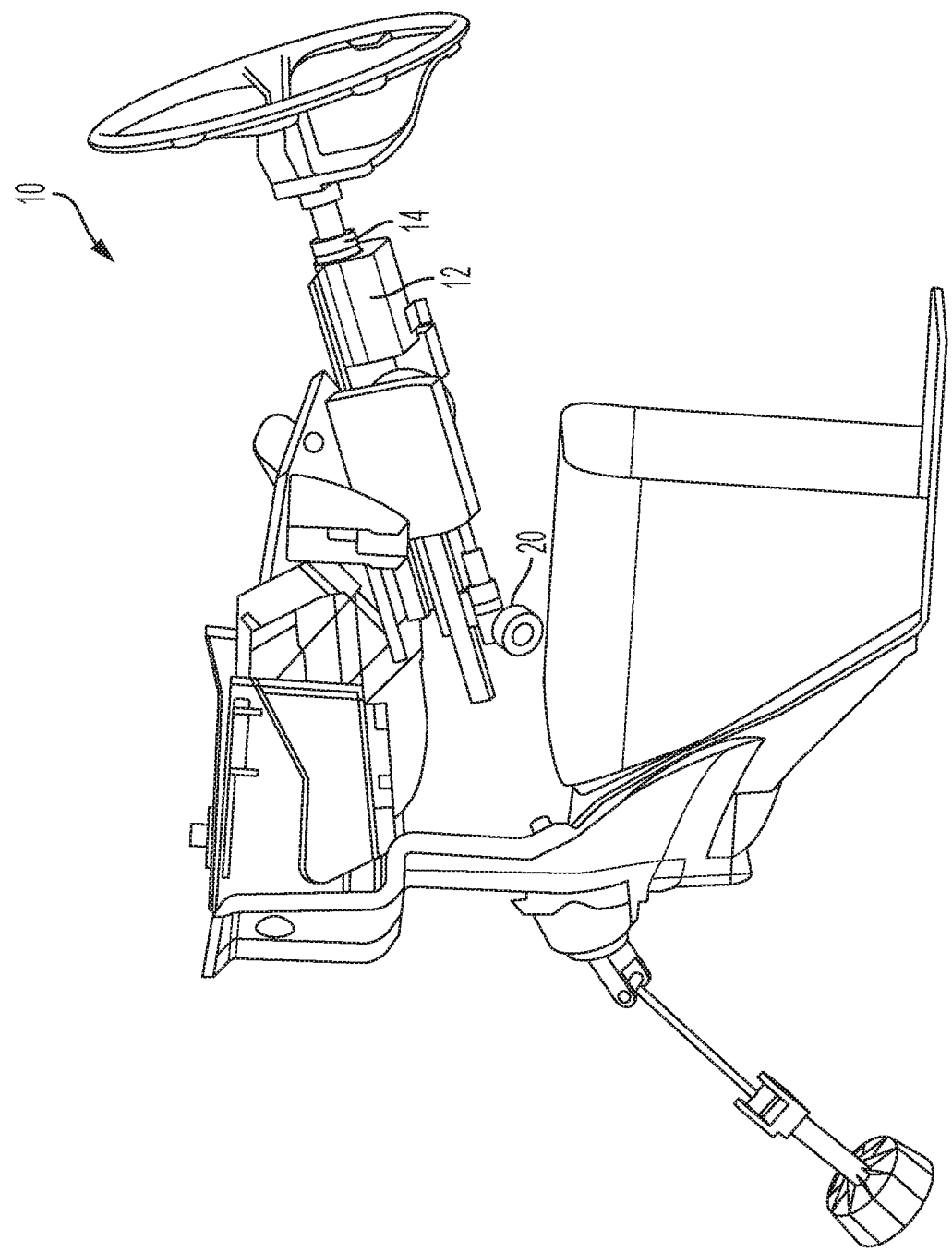
FIG. 4 is a perspective view of the moveable steering column assembly, shown in the first position.
Figure 5:
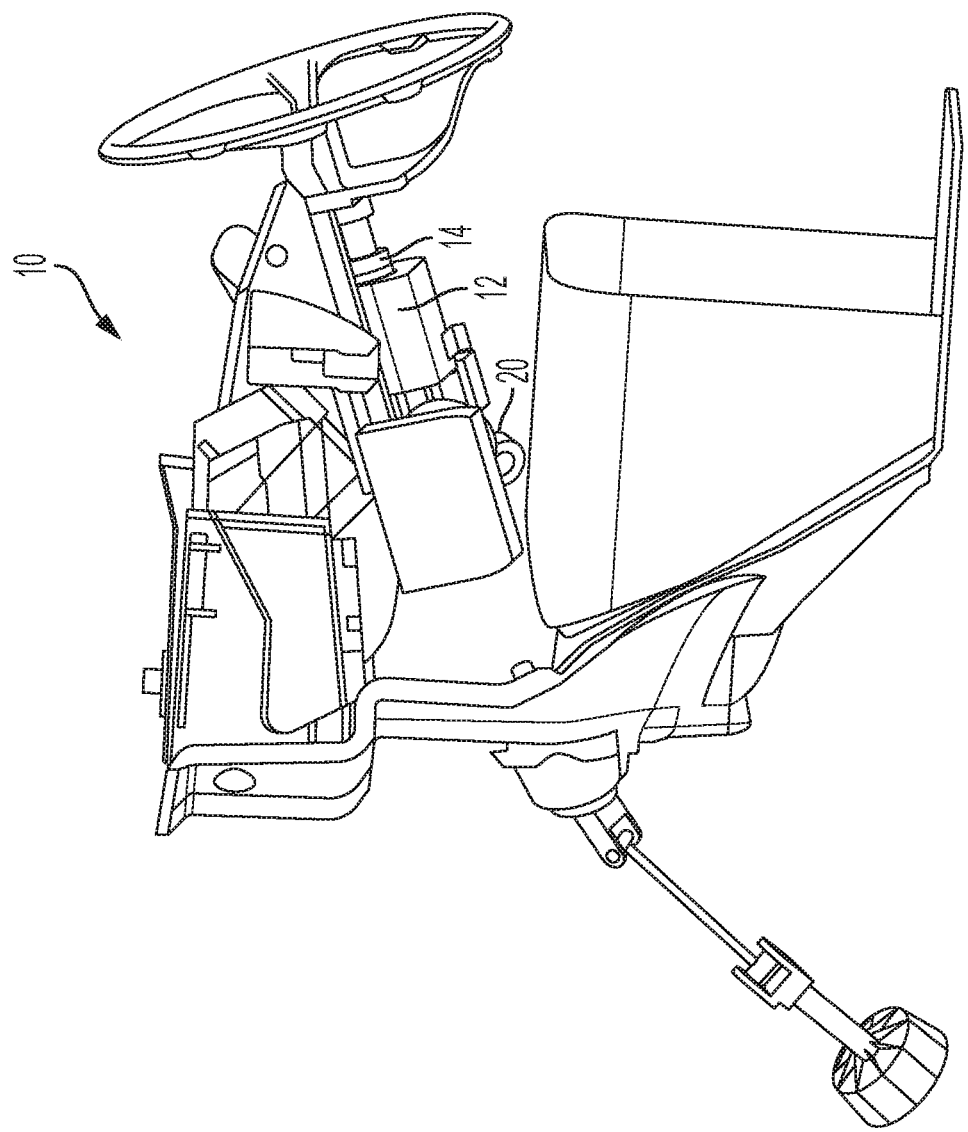
FIG. 5 is a perspective view of the moveable steering column assembly, shown in the third position.

FIG. 1 shows the moveable steering column assembly 10 in a first position, while FIG. 2 shows the assembly 10 in a second position. As illustrated, the second position of FIG. 2 has the steering column assembly 10 (along with the handwheel) retracted away from a driver position to provide more space. To achieve this position, the above-described telescoping of the second jacket portion 14 within the first jacket portion 12 is carried out, as well as additional retraction with axial translation of the first jacket portion 12. FIGS. 3-5 also illustrate a progression of retraction from FIG. 3 to FIG. 5 in additional detail.

The telescoping and translating movement may be actuated by any suitable electromechanical actuator. By way of non-limiting example, the electromechanical actuator may be a motor operatively coupled to a lead screw assembly that drives movement of one or more jacket portions. In some embodiments, a single actuator 20 is utilized to accomplish the actuation. In such an embodiment, the single actuator 20 drives the telescoping movement of the second jacket portion 14 and the translating movement of the first jacket portion 12. The single actuator 20 may be located in various places within the overall steering column assembly 10 in different embodiments.

Figure 6:
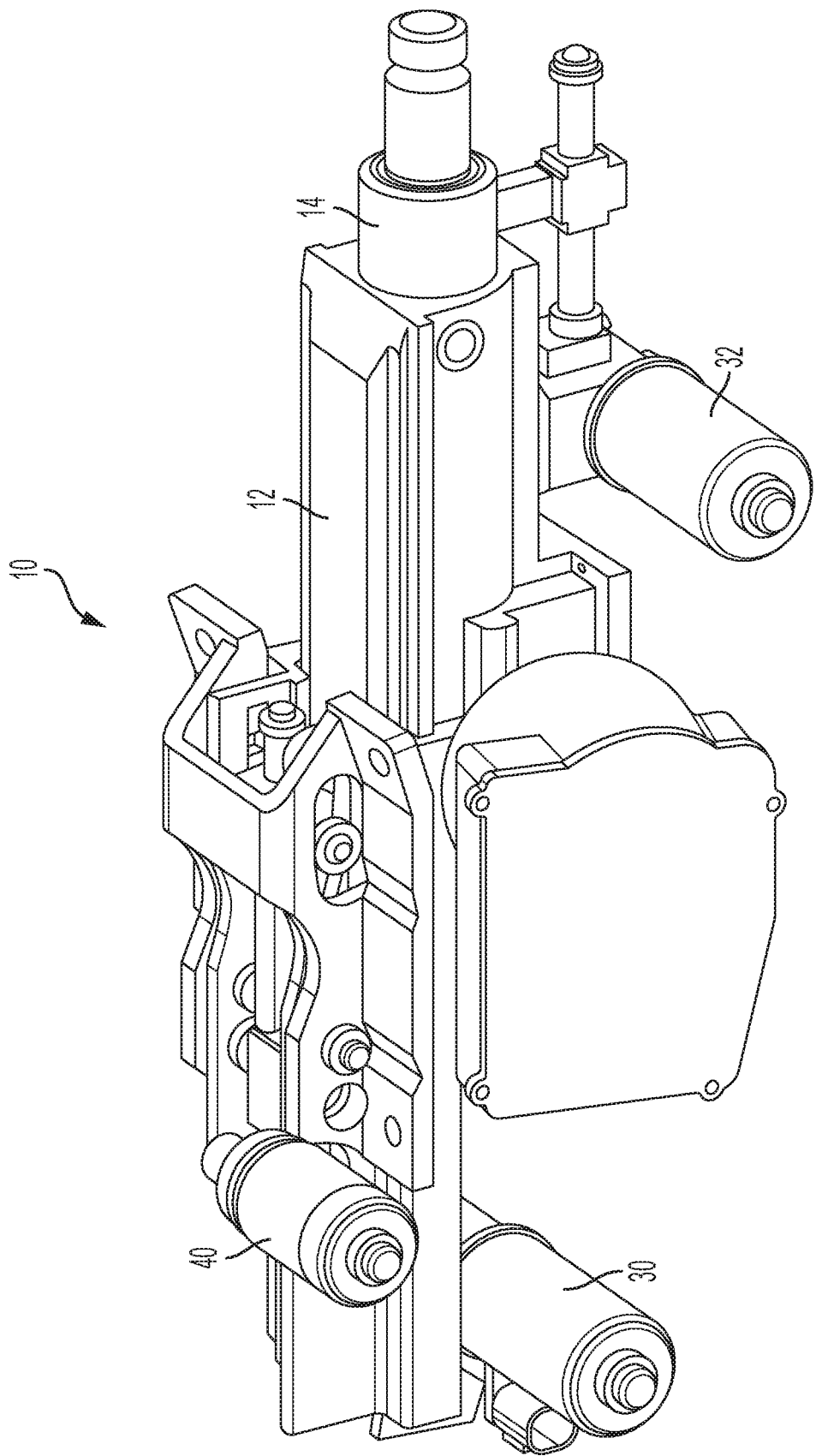
FIG. 6 is a perspective view of the moveable steering column assembly according to another aspect of the disclosure.

In the embodiment of FIG. 6, two electromechanical actuators are employed to achieve the above-described telescoping and translating motion. In particular, a first actuator 30 is operatively coupled to the first jacket portion 12 to actuate axial translation of the first jacket 12. As with the embodiments described herein, this may be done in any suitable manner including, but not limited to, a lead screw assembly. A second actuator 32 is operatively coupled to the second jacket portion 14 to actuate telescoping movement of the second jacket portion 14. As described above, the actuators 30, 32 may be located in various places within the overall steering column assembly 10 in different embodiments. The second actuator 32 is operatively mounted to the first jacket portion 12 and the second actuator 32 translates with the first jacket portion 12 during translation of the first jacket portion 12.

Any of the embodiments described herein may include a rake actuator 40 (FIG. 6) that is used to actuate a rake adjustment of the moveable steering column assembly.

In some embodiments, the first jacket portion 12 and the second jacket portion 14 may be configured to translate and telescope, respectively, simultaneously. In other words, the telescoping motion of one jacket portion and the translating motion of another jacket portion occur at the same time. In other embodiments, the first jacket portion 12 and the second jacket portion 14 are configured to sequentially translate and then telescope, respectively. In other words, the first jacket portion 12 translates to a specific axial position and then subsequently the second jacket portion 14 telescopes within the first jacket portion 12. In other embodiments, the second jacket portion 14 and the first jacket portion 12 are configured to sequentially telescope and then translate, respectively. In other words, the second jacket portion 14 telescopes within the first jacket portion 12 and then subsequently the first jacket portion 12 translates.

In these examples, the steering column assembly can combine both translational motion (e.g., linear translational motion) and telescopic motion, in a single steering column assembly. Versions of the steering column assembly can include and combine one or more telescoping shafts, and one or more translating jackets for the steering column assembly. In the illustrated embodiments, the steering column assembly can include a telescopic shaft that can telescope in and out of a first jacket of to the steering column assembly, and the first jacket can translate relative to a second jacket of the steering column assembly.

These embodiments can utilize the available space in an environment in a more efficient way. For example, in steer-by-wire applications, this design can be improve performance. Although applications having a large hand wheel actuator requiring additional space can restrict the effective use of the space for stow or storage of the steering column assembly (and hand wheel actuator), the embodiments disclosed herein can overcome such limitations. The steering column assembly can translate and telescope at the same time, or sequentially in any combination, during the stowing of the steering column assembly.

Any feature, element, component or advantage of any one embodiment can be used on any of the other embodiments.

While the various embodiments have been described in detail in connection with only a limited number of examples, it should be readily understood that they are not limited to such disclosed versions. Rather, the embodiments can be modified to incorporate any number of variations, alterations, substitutions or equivalent arrangements not heretofore described, but which are commensurate with the spirit and scope of this disclosure. Additionally, while various embodiments have been described, it is to be understood that aspects may include only some of the described features and components. Accordingly, the embodiments are not to be seen as limited by the foregoing description.

Having thus described the invention, it is claimed:

1. A moveable steering column assembly comprising:
a first jacket axially translatable along a longitudinal axis of the moveable steering column assembly;
a second jacket operatively coupled to the first jacket and in telescoping engagement with the first jacket; and
a single actuator operatively coupled to the second jacket, the single actuator actuating telescoping movement of the second jacket to an end stop position within the first jacket with a lead screw assembly operatively coupled to an exterior surface of the second jacket and driven by the single actuator, the single actuator also actuating axial translation of the first jacket.

2. The moveable steering column assembly of claim 1, wherein the single actuator is operatively mounted to the first jacket, the single actuator translating with the first jacket during translation of the first jacket.

3. The moveable steering column assembly of claim 1, wherein the first jacket and the second jacket are part of a steer-by-wire steering column assembly.

4. The moveable steering column assembly of claim 1, wherein the first jacket and the second jacket are part of an autonomous driving system.

5. A moveable steering column assembly comprising:
a first jacket axially translatable along a longitudinal axis of the moveable steering column assembly;

a second jacket operatively coupled to the first jacket and in telescoping engagement with the first jacket;

a first actuator operatively coupled to the first jacket to actuate axial translation of the first jacket;

a second actuator operatively coupled to the second jacket to actuate telescoping movement of the second jacket, wherein the second actuator is operatively mounted to the first jacket, the second actuator translating with the first jacket during translation of the first jacket; and a third actuator to actuate a rake adjustment of the moveable steering column assembly, wherein the first jacket and the second jacket are part of an autonomous driving system.

6. The moveable steering column assembly of claim 5, wherein the first jacket and the second jacket are configured to translate and telescope, respectively, simultaneously.

7. The moveable steering column assembly of claim 5, wherein the first jacket and the second jacket are configured to sequentially translate and then telescope, respectively.

8. The moveable steering column assembly of claim 5, wherein the second jacket and the first jacket are configured to sequentially telescope and then translated, respectively.

9. The moveable steering column assembly of claim 5, wherein the first jacket and the second jacket are part of a steer-by-wire steering column assembly.

* * * * *